US012296440B2

(12) United States Patent
Kukucka et al.

(10) Patent No.: US 12,296,440 B2
(45) Date of Patent: May 13, 2025

(54) ANTI-SLIP MULTIDIRECTIONAL FASTENER REMOVER TOOL

(71) Applicant: GRIP HOLDINGS LLC, Brandon, FL (US)

(72) Inventors: Paul Kukucka, Brandon, FL (US); Thomas Stefan Kukucka, Brandon, FL (US)

(73) Assignee: GRIP HOLDINGS LLC, Brandon, FL (US)

( * ) Notice: Subject to any disclaimer, the term of this patent is extended or adjusted under 35 U.S.C. 154(b) by 431 days.

(21) Appl. No.: 17/603,310

(22) PCT Filed: Apr. 11, 2020

(86) PCT No.: PCT/IB2020/053457

§ 371 (c)(1),
(2) Date: Oct. 12, 2021

(87) PCT Pub. No.: WO2020/208608

PCT Pub. Date: Oct. 15, 2020

(65) Prior Publication Data

US 2023/0173648 A1 Jun. 8, 2023

Related U.S. Application Data

(60) Provisional application No. 62/833,372, filed on Apr. 12, 2019.

(51) Int. Cl.
*B25B 15/00* (2006.01)
*B25B 27/18* (2006.01)

(52) U.S. Cl.
CPC ............ *B25B 15/008* (2013.01); *B25B 27/18* (2013.01)

(58) Field of Classification Search
CPC ... B25B 15/004; B25B 15/005; B25B 15/008; B25B 27/18
See application file for complete search history.

(56) References Cited

U.S. PATENT DOCUMENTS

| | | | |
|---|---|---|---|
| 1,798,944 | A | 3/1931 | Jackman |
| 3,405,377 | A | 10/1968 | Pierce |
| 3,495,485 | A | 2/1970 | Knudsen et al. |
| 3,902,384 | A | 9/1975 | Ehrler |

(Continued)

FOREIGN PATENT DOCUMENTS

| | | |
|---|---|---|
| AU | 201612229 | 4/2016 |
| AU | 201612720 | 6/2016 |

(Continued)

*Primary Examiner* — David B. Thomas

(57) ABSTRACT

An anti-slip multidirectional fastener remover tool includes a torque-tool body and a plurality of engagement features. A cross section for each of the plurality of engagement features includes a bracing portion, at least one cavity portion, a first interior angle, and a second interior angle. The plurality of engagement features is radially and outwardly distributed about a rotational axis of the torque-tool body. The bracing portion and the cavity portion are adjacently connected to each other about the first interior angle. The cavity portion is oriented towards the rotational axis as the second interior angle is delineated between a first lateral section and a second lateral section of the cavity portion.

8 Claims, 13 Drawing Sheets

(56) References Cited

U.S. PATENT DOCUMENTS

| | | | |
|---|---|---|---|
| 3,908,489 A | | 9/1975 | Yamamoto et al. |
| 4,074,597 A | | 2/1978 | Jansson |
| 4,598,616 A | | 7/1986 | Colvin |
| 4,607,547 A | | 8/1986 | Martus |
| 4,893,530 A | | 1/1990 | Warheit |
| 4,927,020 A | | 5/1990 | Randy |
| 4,930,378 A | | 6/1990 | Colvin |
| 5,019,080 A | | 5/1991 | Hemer |
| 5,219,392 A | | 6/1993 | Ruzicka et al. |
| 5,228,570 A | | 7/1993 | Robinson |
| 5,251,521 A | | 10/1993 | Burda et al. |
| 5,398,823 A | | 3/1995 | Anders |
| 5,481,948 A | | 1/1996 | Zerkovitz |
| 5,501,342 A | | 3/1996 | Geibel |
| 5,519,929 A | | 5/1996 | Bleckman |
| 5,577,871 A | | 11/1996 | Brugola |
| 5,645,177 A | | 7/1997 | Lin |
| 5,669,516 A | | 9/1997 | Horn |
| 5,725,107 A | | 3/1998 | Dembicks |
| 5,743,394 A | | 4/1998 | Martin |
| 5,782,148 A | | 7/1998 | Kerkhoven |
| 5,829,327 A | | 11/1998 | Stanton |
| 5,832,792 A | | 11/1998 | Hsieh |
| 5,873,290 A | * | 2/1999 | Chaconas ............. B25B 15/005 81/436 |
| 6,009,778 A | | 1/2000 | Hsieh |
| 6,092,279 A | | 7/2000 | Shoup |
| 6,352,011 B1 | | 3/2002 | Fruhm |
| 6,431,373 B1 | | 8/2002 | Blick |
| 6,575,057 B1 | | 6/2003 | Ploeger |
| 6,761,089 B2 | | 1/2004 | Bergamo |
| 6,698,316 B1 | | 3/2004 | Wright |
| 6,755,098 B2 | | 6/2004 | Huang |
| 6,857,340 B2 | | 2/2005 | Wagner |
| 6,951,156 B2 | | 10/2005 | Garg |
| 7,000,501 B1 | | 2/2006 | Chen |
| D524,615 S | | 7/2006 | Albertson |
| 7,225,710 B2 | | 6/2007 | Pacheco |
| 7,331,260 B2 | | 2/2008 | Cheng |
| 7,717,278 B2 | | 1/2010 | Kao |
| D614,931 S | | 5/2010 | Su |
| 7,788,994 B2 | | 9/2010 | Wright et al. |
| 7,841,480 B2 | | 11/2010 | Hsieh |
| 7,913,593 B2 | | 3/2011 | Dahar et al. |
| 8,166,851 B2 | | 5/2012 | Pchola |
| 8,302,255 B2 | | 11/2012 | Lin |
| 8,336,709 B1 | | 12/2012 | Geibel |
| D745,814 S | | 12/2015 | Hsieh |
| D776,505 S | | 1/2017 | Doroslovac |
| 9,687,968 B2 | | 1/2017 | Doroslovac et al. |
| D784,106 S | | 4/2017 | Doroslovac |
| D794,405 S | | 8/2017 | Doroslovac et al. |
| 9,718,170 B2 | | 8/2017 | Eggert |
| D798,682 S | | 10/2017 | Doroslovac et al. |
| 9,873,195 B1 | | 1/2018 | Buxton |
| 9,878,441 B1 | | 1/2018 | Kao |
| D829,069 S | | 9/2018 | Doroslovac et al. |
| 10,081,094 B2 | | 9/2018 | Doroslovac et al. |
| D859,944 S | | 9/2019 | Kukucka et al. |
| D859,945 S | | 9/2019 | Kukucka et al. |
| D859,946 S | | 9/2019 | Kukucka et al. |
| D859,947 S | | 9/2019 | Kukucka et al. |
| D867,841 S | | 11/2019 | Kukucka et al. |
| D868,553 S | | 12/2019 | Kukucka et al. |
| D879,577 S | | 3/2020 | Kukucka et al. |
| D880,968 S | | 4/2020 | Kukucka et al. |
| D880,977 S | | 4/2020 | Kukucka et al. |
| D885,149 S | | 5/2020 | Kukucka et al. |
| D887,233 S | | 6/2020 | Kukucka et al. |
| D887,711 S | | 6/2020 | Kukucka et al. |
| D889,224 S | | 7/2020 | Kukucka et al. |
| D889,257 S | | 7/2020 | Kukucka et al. |
| D892,578 S | | 8/2020 | Kukucka et al. |
| 10,780,556 B2 | | 9/2020 | Kukucka et al. |
| 10,786,890 B2 | | 9/2020 | Kukucka et al. |
| D899,091 S | | 10/2020 | Kukucka et al. |
| 10,828,766 B2 | | 11/2020 | Kukucka et al. |
| D904,152 S | | 12/2020 | Kukucka et al. |
| D906,781 S | | 1/2021 | Kukucka et al. |
| 10,882,162 B2 | | 1/2021 | Doroslovac et al. |
| D909,842 S | | 2/2021 | Kukucka et al. |
| D910,490 S | | 2/2021 | Lim et al. |
| 10,919,133 B2 | | 2/2021 | Kukucka et al. |
| 10,967,488 B2 | | 4/2021 | Kukucka et al. |
| 2003/0209111 A1 | | 11/2003 | Huang |
| 2004/0256263 A1 | | 12/2004 | Shih |
| 2005/0098459 A1 | | 5/2005 | Gorman |
| 2005/0103664 A1 | | 5/2005 | Shih |
| 2005/0257357 A1 | | 11/2005 | Huang |
| 2006/0130618 A1 | | 6/2006 | Hsieh |
| 2006/0156869 A1 | | 7/2006 | Hsieh |
| 2006/0266168 A1 | | 11/2006 | Pacheco, Jr. |
| 2007/0261519 A1 | | 11/2007 | Cheng |
| 2008/0235930 A1 | | 10/2008 | English |
| 2009/0007732 A1 | | 1/2009 | Hsieh |
| 2009/0120885 A1 | | 5/2009 | Kao |
| 2009/0220321 A1 | | 9/2009 | Sakamura |
| 2011/0056339 A1 | | 3/2011 | Su |
| 2011/0303052 A1 | | 12/2011 | Chen |
| 2012/0060656 A1 | | 3/2012 | Chang |
| 2013/0047798 A1 | | 2/2013 | Huang |
| 2014/0260832 A1 | | 9/2014 | Hsiao |
| 2014/0331826 A1 | | 11/2014 | Campbell |
| 2014/0360321 A1 | | 12/2014 | Steinweg et al. |
| 2015/0135910 A1 | | 5/2015 | Eggert et al. |
| 2015/0266169 A1 | | 9/2015 | Campbell, II |
| 2015/0314429 A1 | | 11/2015 | Doroslovac et al. |
| 2016/0067853 A1 | | 3/2016 | Neto |
| 2016/0136792 A1 | | 5/2016 | Harp |
| 2016/0223005 A1 | | 8/2016 | Rathmann |
| 2016/0339564 A1 | | 11/2016 | Chen |
| 2017/0246733 A1 | | 8/2017 | Shehab |
| 2017/0252905 A1 | | 9/2017 | Doroslovac |
| 2017/0282337 A1 | | 10/2017 | Johnson et al. |
| 2017/0312839 A1 | | 11/2017 | Moss et al. |
| 2017/0312897 A1 | | 11/2017 | Doroslovac et al. |
| 2018/0003241 A1 | | 1/2018 | Goss |
| 2018/0141192 A1 | | 5/2018 | Chang |
| 2018/0354022 A1 | | 12/2018 | Ross et al. |
| 2018/0354102 A1 | | 12/2018 | Kukucka et al. |
| 2019/0001469 A1 | | 1/2019 | Cho et al. |
| 2019/0015961 A1 | | 1/2019 | Kukucka et al. |
| 2019/0152033 A1 | | 5/2019 | Kukucka et al. |
| 2019/0283233 A1 | | 9/2019 | Kukucka et al. |
| 2019/0337131 A1 | | 11/2019 | Kukucka et al. |
| 2019/0375077 A1 | | 12/2019 | Kukucka et al. |
| 2020/0078908 A1 | | 3/2020 | Wu et al. |
| 2020/0298380 A1 | | 9/2020 | Doroslovac et al. |
| 2020/0376648 A1 | | 12/2020 | Kukucka et al. |
| 2020/0391360 A1 | | 12/2020 | Kukucka et al. |
| 2021/0039245 A1 | | 2/2021 | Kukucka et al. |

FOREIGN PATENT DOCUMENTS

| | | | |
|---|---|---|---|
| AU | 201612721 | | 6/2016 |
| CA | 2564093 | A1 | 4/2007 |
| CA | 168071 | | 12/2016 |
| CA | 2898480 | A1 | 7/2017 |
| CN | 2767068 | Y | 3/2006 |
| CN | 3630254 | | 6/2006 |
| CN | 201046555 | Y | 4/2008 |
| CN | 102395447 | | 3/2012 |
| CN | 102554833 | A | 7/2012 |
| CN | 303924849 | | 11/2016 |
| CN | 303956827 | | 12/2016 |
| CN | 303984883 | | 12/2016 |
| DE | 3911409 | A1 | 10/1990 |
| DE | 29613327 | U1 | 9/1996 |
| DE | 10321284 | A1 | 12/2004 |
| DE | 202010006146 | U1 | 7/2010 |
| DE | 102012104298 | A1 | 11/2013 |
| DE | 102013021238 | A1 | 6/2015 |
| EP | 0930132 | A2 | 7/1999 |
| EP | 0930132 | A3 | 11/2000 |

(56) References Cited

FOREIGN PATENT DOCUMENTS

| | | | |
|---|---|---|---|
| EP | 1371453 | A2 | 12/2003 |
| EP | 1731774 | A1 | 12/2006 |
| EP | 0930132 | B1 | 4/2007 |
| GB | 906839 | A | 9/1962 |
| GB | 1294764 | A | 11/1972 |
| JP | 2011143522 | | 7/2011 |
| JP | 2012157913 | | 10/2011 |
| JP | 2012157913 | A | 8/2012 |
| JP | 2015180835 | A | 7/2017 |
| KR | 200149097 | Y1 | 7/1999 |
| RU | 2152870 | C1 | 7/2000 |
| RU | 2225786 | C2 | 1/2001 |
| RU | 45671 | U1 | 5/2005 |
| RU | 58510 | U1 | 11/2006 |
| RU | 2387533 | C1 | 4/2010 |
| RU | 116398 | | 5/2012 |
| RU | 180548 | U1 | 6/2018 |
| SU | 16616 | A1 | 8/1930 |
| TW | 362059 | B | 6/1999 |
| WO | 1994016862 | A1 | 8/1994 |
| WO | 1996010932 | A1 | 4/1996 |
| WO | 1996026870 | A1 | 9/1996 |
| WO | 1996027745 | A1 | 9/1996 |
| WO | 1997010926 | A1 | 3/1997 |
| WO | 1998012982 | A1 | 4/1998 |
| WO | 1999032264 | A1 | 7/1999 |
| WO | 2001066312 | A1 | 9/2001 |
| WO | 2004002687 | A1 | 1/2004 |
| WO | 2005070621 | | 8/2005 |
| WO | 2006023374 | | 3/2006 |
| WO | 2006130490 | A1 | 12/2006 |
| WO | 2010007402 | A1 | 1/2010 |
| WO | 2011109040 | A1 | 9/2011 |
| WO | 2015082283 | A1 | 6/2015 |
| WO | 2015050942 | A1 | 9/2015 |
| WO | 2016051080 | A1 | 4/2016 |
| WO | DM/090809 | | 4/2016 |
| WO | DM/091188 | | 5/2016 |
| WO | DM/091189 | | 5/2016 |
| WO | 2016174615 | A1 | 11/2016 |
| WO | 2017178997 | | 10/2017 |
| WO | 2017187388 | A1 | 11/2017 |
| WO | 2018150360 | A1 | 8/2018 |
| WO | 2018172831 | | 9/2018 |
| WO | 2019012486 | | 1/2019 |
| WO | 2019167032 | | 9/2019 |
| WO | 2019175652 | | 9/2019 |
| WO | 2020039281 | | 2/2020 |
| WO | 2020039285 | | 2/2020 |
| WO | 2020058777 | | 3/2020 |
| WO | 2020152516 | | 7/2020 |
| WO | 2020208608 | | 10/2020 |
| WO | 2020225800 | | 11/2020 |
| WO | 2021001696 | | 1/2021 |
| WO | 2021019500 | | 2/2021 |
| WO | 2021033152 | | 2/2021 |

* cited by examiner

ANTI-SLIP MULTIDIRECTIONAL FASTENER REMOVER TOOL

FIELD OF THE INVENTION

The present invention generally relates to various fastening methods. More specifically, the present invention is an anti-slip multidirectional driver bit that is designed to prevent damaging or stripping fasteners during the extraction or tightening process.

BACKGROUND OF THE INVENTION

Hex bolts, nuts, screws, and other similar threaded devices are used to secure and hold multiple components together by being engaged to a complimentary thread, known as a female thread. The general structure of these types of fasteners is a cylindrical shaft with an external thread and a head at one end of the shaft. The external thread engages a complimentary female thread tapped into a hole or a nut and secures the fastener in place, fastening the associated components together. The internal head receives an external torque force and is the means by which the fastener is turned, or driven, into the female threading. The internal socket head is shaped specifically to allow an external tool like a Hex Key to apply a torque to the fastener in order to rotate the fastener and engage the complimentary female threading to a certain degree. This type of fastener is simple, extremely effective, cheap, and highly popular in modern construction.

One of the most common problems in using these types of fasteners, whether male or female, is the tool slipping in the head portion, or slipping on the head portion. This is generally caused by either a worn fastener or tool, corrosion, overtightening, or damage to the head portion of the fastener. The present invention is a bit driver design that virtually eliminates slippage, when used in conjunction with the appropriate matching fastener. The tool design uses a series of segmented portions that bite into the head of the fastener and allow for efficient torque transfer between the driving bit and the head portion of the fastener. The present invention eliminates the need for the common bolt extractors as they require unnecessary drilling and tools. With the development of electric screwdrivers, and drills, people have been using, power tools to apply the required torsional forces and remove various fasteners. Most power driver end bits have a standardized one fourth inch hex holder and come in various configurations including but not limited to, square end, hex end, or star end.

DETAIL DESCRIPTIONS OF THE INVENTION

All illustrations of the drawings are for the purpose of describing selected versions of the present invention and are not intended to limit the scope of the present invention.

The present invention generally related to an anti-slip multidirectional fastener remover tool to remove damaged/stripped fasteners. The present invention is compatible with a female opening of the fastener head. More specifically, the internal lateral surface of the female opening of the fastener head to engage with the present invention for tightening or loosening a male fastener. An example of the male fastener is a bolt fastener that has a hex shaped female opening within the fastener head. In addition, the present invention is compatible with male fasteners of a right-hand thread and male fasteners of a left-hand thread.

Figure 1:
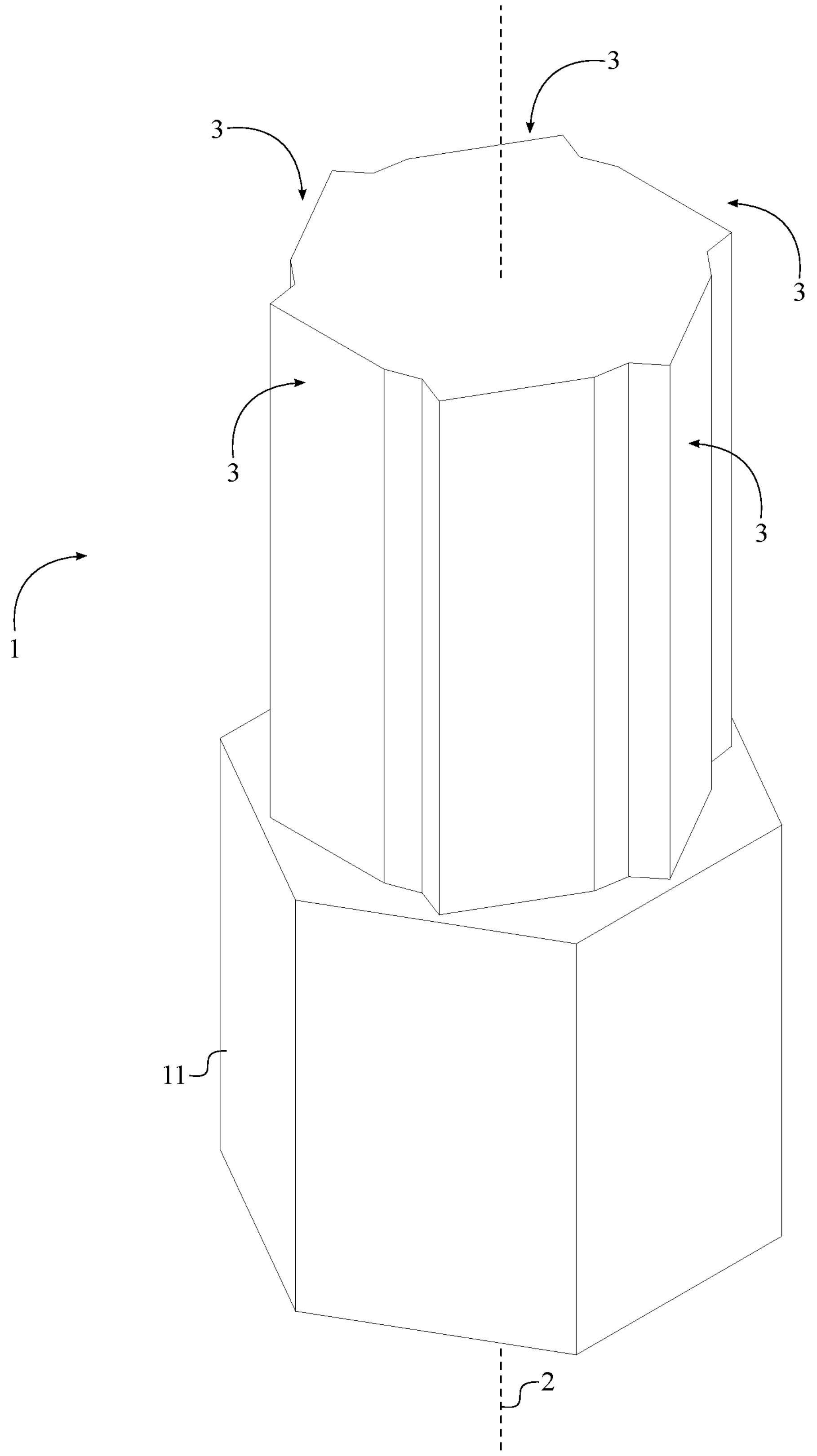
FIG. 1 is a perspective view of the first embodiment of the present invention.
Figure 2:
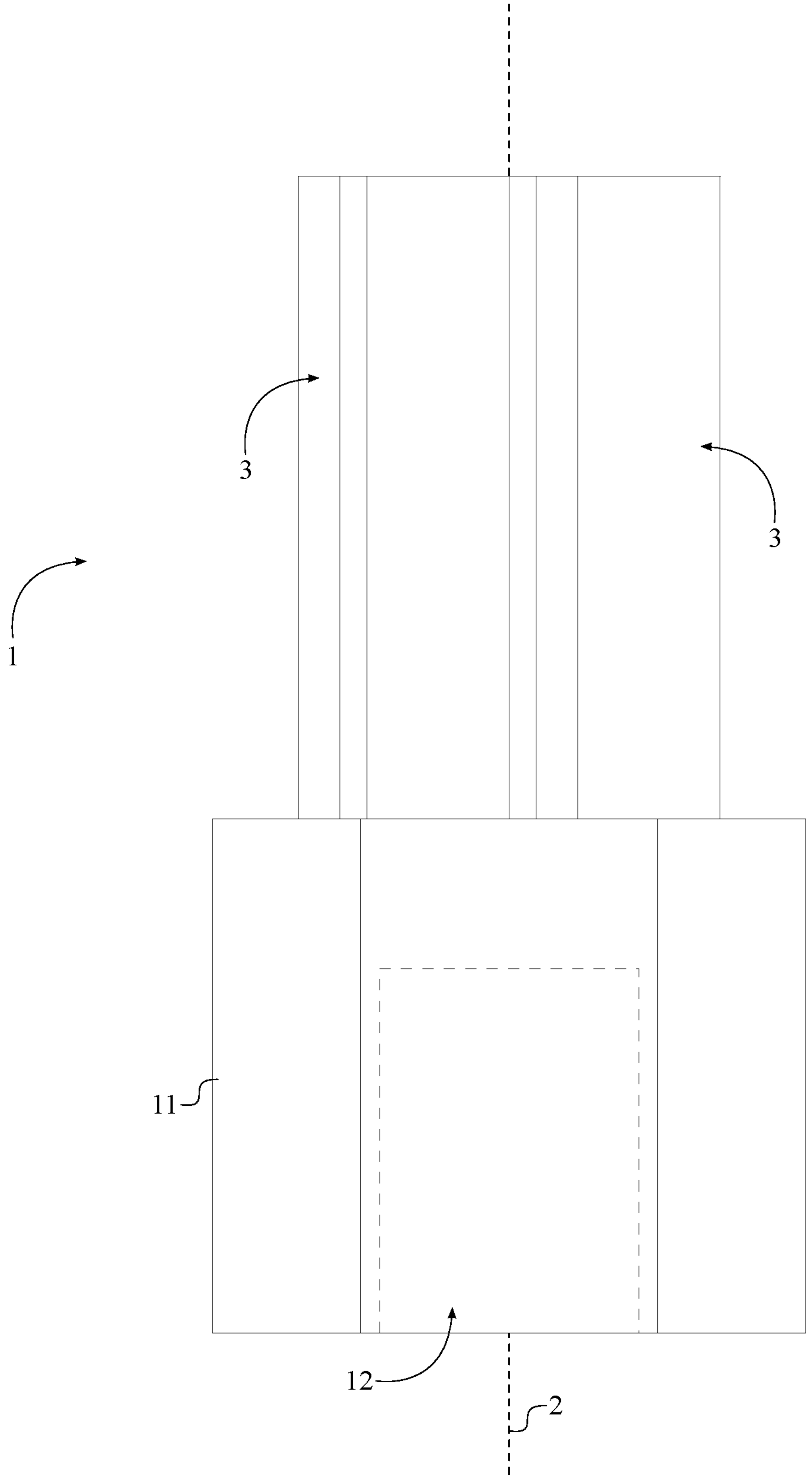
FIG. 2 is a side view of the first embodiment of the present invention.
Figure 3:
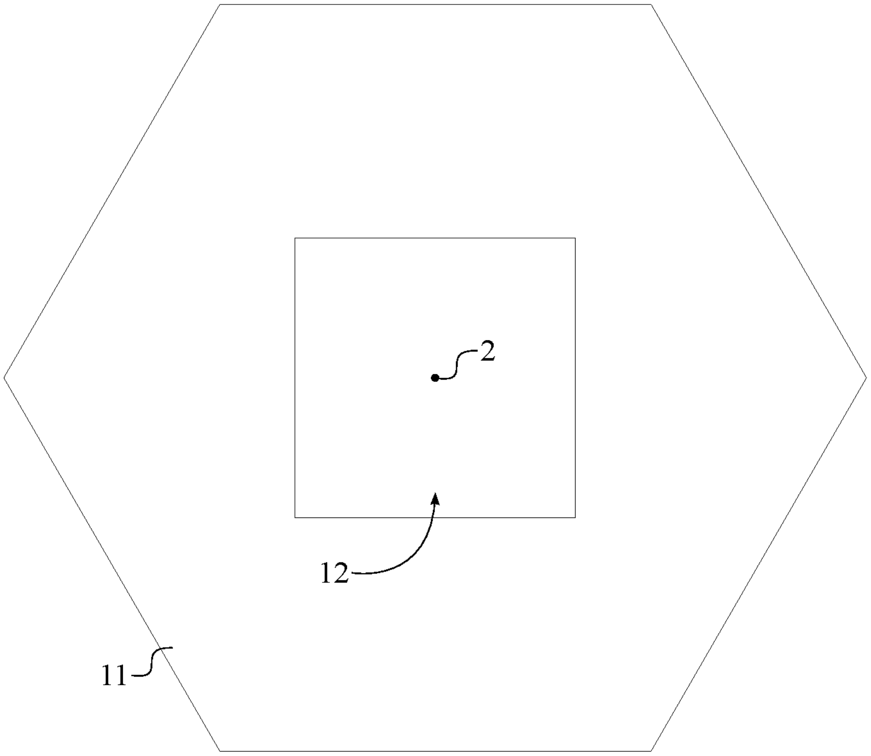
FIG. 3 is a bottom view of the first embodiment of the present invention.

Referring to FIG. 1-13, the present invention comprises a torque-tool body 1 and a plurality of engagement features 3. The torque-tool body 1 is used as the physical structure to apply the corresponding force by the plurality of engagement features 3 on the fastener head. For a male fastener with a female opening within fastener head, the torque-tool body 1 is an extrusion that is sized to fit within the female opening in an interlocking manner, similar to a hex bit. The length, width, and diameter of the torque-tool body 1 may vary to fit different sized female opening. The plurality of engagement features 3 prevents slippage during fastener extraction and is radially positioned around a rotational axis 2 of the torque-tool body 1 as seen in FIG. 1-2. More specifically, the plurality of engagement features 3 is perimetrically oriented around the torque-tool body 1 to grip the internal lateral corners of the female opening. As a result, the plurality of engagement features 3 facilitates the transfer of torque to the female fastener head by preventing slippage between the torque-tool body 1 and the fastener head.

In reference to FIG. 1-2, the torque-tool body 1 is outwardly extended to the plurality of engagement features 3 from the rotational axis 2. This yields a bit-like structure with the plurality of engagement features 3 being distributed about the rotational axis 2 on the external surface of the torque-tool body 1, similar but in no way limited to a hex bit.

A traditional hex bit design transfers the majority of the torque to the female opening of the fastener head through the inner lateral corners of the female opening. Over time, the degradation of the inner lateral corners forces drivers such as hex bits to engage the fastener away from the corner and further towards the center of the fastener inner wall bracing surface reducing the efficiency of transferring torque from the hex bit to the fastener head thus causing fastener material to stretch and round and in turn allowing a traditional hex bit or other internal drive profiles to slip within the fastener drive head. The present invention overcomes this problem by removing material from the torque tool body and creating the cavity portion in such a way to transfer torque to the lateral corners of the fastener head. This is accomplished through the use of the plurality of engagement features 3. Each of the plurality of engagement features 3 is positioned to engage or "bite" the internal lateral corners of the female opening instead of the inner lateral surface. This ensures an adequate amount of torque is transferred to the fastener head to initiate rotation, resultantly, preventing rounding and facilitating the extraction of the damaged/stripped fastener.

In reference to FIGS. 4, 6, 8, and 10, a cross section for each of the plurality of engagement features 3 comprises a bracing portion 4, at least one cavity portion 5, a first interior angle 8, and a second interior angle 9. A gripping edge 20 is delineated in between a pair of engagement features 3 or within one of the engagement features 3 so that the gripping edge 20 is able to cut into the fastener head during the removal of the damaged/stripped fastener. The cavity portion 5 is a fastener material catchment basin for inert fastener material. When torque is applied to lateral corner by the griping edge that presses against the fastener and pushes fastener lateral corner material creating a grove in the lateral corner of the fastener effectively locking the torque tool to the fastener preventing rounding and slipping. This intern allows the fastener material that is not engaged with the torque tool body 1 to remain inert and accumulate within the fastener material catchment basin. The cavity portion 5 makes no contact with the internal fastener sidewall upon initial insertion of the torque-tool body 1 into fastener head until torque force is applied and the griping edge 20 digs or cuts into the fastener lateral corner and thus resulting in the cavity portion 5 moving towards the fastener sidewall and the fastener material entering the cavity section 5. In other words, when the torque-tool body 1 is initially inserted into the fastener socket head, contact between the plurality of engagement features 3 and socket fastener bracing surface is only made with the bracing surface 4 and gripping edge 20 while the cavity portion 5 remains separated from the fastener bracing surface. More specifically, the bracing portion 4 and the cavity portion 5 are adjacently connected to each other about the first interior angle 8. Preferably, the first interior angle 8 is an obtuse angle, which can range between 91 degrees to 179 degrees, so that the cavity portion 5 can be oriented towards the rotational axis 2 in order to initiate the orientation of the gripping edge 20. The first interior angle 8 is not limited to an angled intersecting point and may be a radial corner for increased wear or tool performance. The gripping edge 20 and the bracing portion 4 are colinear and substantially co-planer. Since the cavity portion 5 is oriented towards the rotational axis 2, the second interior angle 9 is delineated between a first lateral section 6 and a second lateral section 7 of the cavity portion 5. Preferably, the second interior angle 9 is reflex angle that can range between 181 degrees to 359 degrees. As a result, the gripping edge 20 can be pointed outward from the rotational axis 2 thus allowing the gripping edge 20 to cut into the internal lateral corners of the socket fastener.

Furthermore, the plurality of engagement features 3 is equally spaced about the torque-tool body 1 to create an enclosed profile as seen in FIGS. 4, 6, 8, and 10. In order to configure the enclosed profile, the plurality of engagement features 3 comprises an arbitrary feature 13 and an adjacent feature 14. The arbitrary feature 13 is any feature within the plurality of engagement features 3 in such a way that the adjacent feature 14 is the feature directly next to the arbitrary feature 13. As mentioned above, the present invention may be designed to fit a variety of fastener head designs. This is achieved by varying the number of the plurality of engagement features 3 to compliment different types of female openings of the fastener head designs. The number of the plurality of engagement features 3 generally corresponds to the profile of the female opening. For example, a pentagon shaped female opening has five lateral sides. In order to remove the male fastener with the pentagon shaped female opening, a user has to preferably utilize an embodiment of the present invention that comprises five engagement features 3 as the plurality of engagement features 3. Preferably, the number of the plurality of engagement features 3 in contact with the female opening can be eighteen, twelve, six, five, four, or three.

Figure 4:
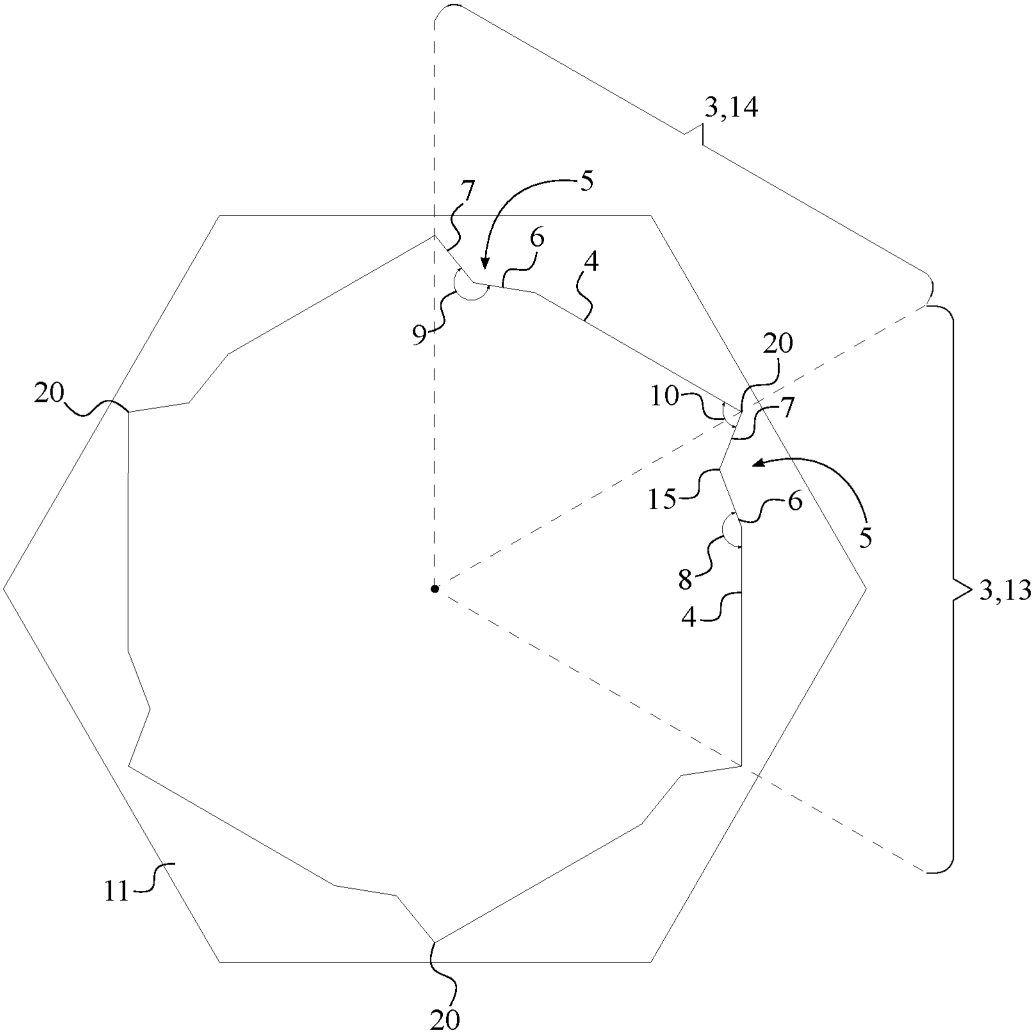
FIG. 4 is a top view of the first embodiment of the present invention, showing the configuration of the plurality of engagement features.

In reference to a first embodiment of the present invention, the bracing portion 4 is adjacently connected to the first lateral section 6. The second lateral section 7 is positioned opposite of the bracing portion 4 about the first lateral section 6 and adjacently connected the first lateral section 6. As shown in FIG. 1-4, the present invention further comprises a third interior angle 10 and the plurality of engagement features 3 comprises an arbitrary feature 13 and an adjacent feature 14. More specifically, the second lateral section 7 of the arbitrary feature 13 and the bracing portion 4 of the adjacent feature 14 are adjacently positioned with each other about the third interior angle 10 thus delineating the radial profile of the first embodiment. Furthermore, the third interior angle 10 is an obtuse angle so that the gripping edge 20 can be oriented outward from the rotational axis 2. Preferably, the third interior angle 10 of the first embodiment is greater than 90 degrees and lesser than 120 degrees. Alternatively, the third interior angle 10 may be a right angle but not less than 90 degrees. Furthermore, the first lateral section 6 and the second lateral section 7 intersect about an angular edge 15, wherein a bottom edge of the cavity portion 5 is defined precisely where the first lateral section 6 and the second lateral section 7 intersect with each other. Alternatively, the first lateral section 6 and the second lateral section 7 may be connected by an arbitrary angled or curved section. The plurality of engagement features 3 of the first embodiment is equally spaced about the torque-tool body 1 to create an enclosed profile as seen in FIG. 4. The length of the bracing portion 4, the first lateral section 6, and the second lateral section 7 may change. Similarly, the first interior angle 8, the second interior angle 9, and the third interior angle 10 may vary to create a sharper the gripping edge 20 of the first embodiment.

Figure 5:
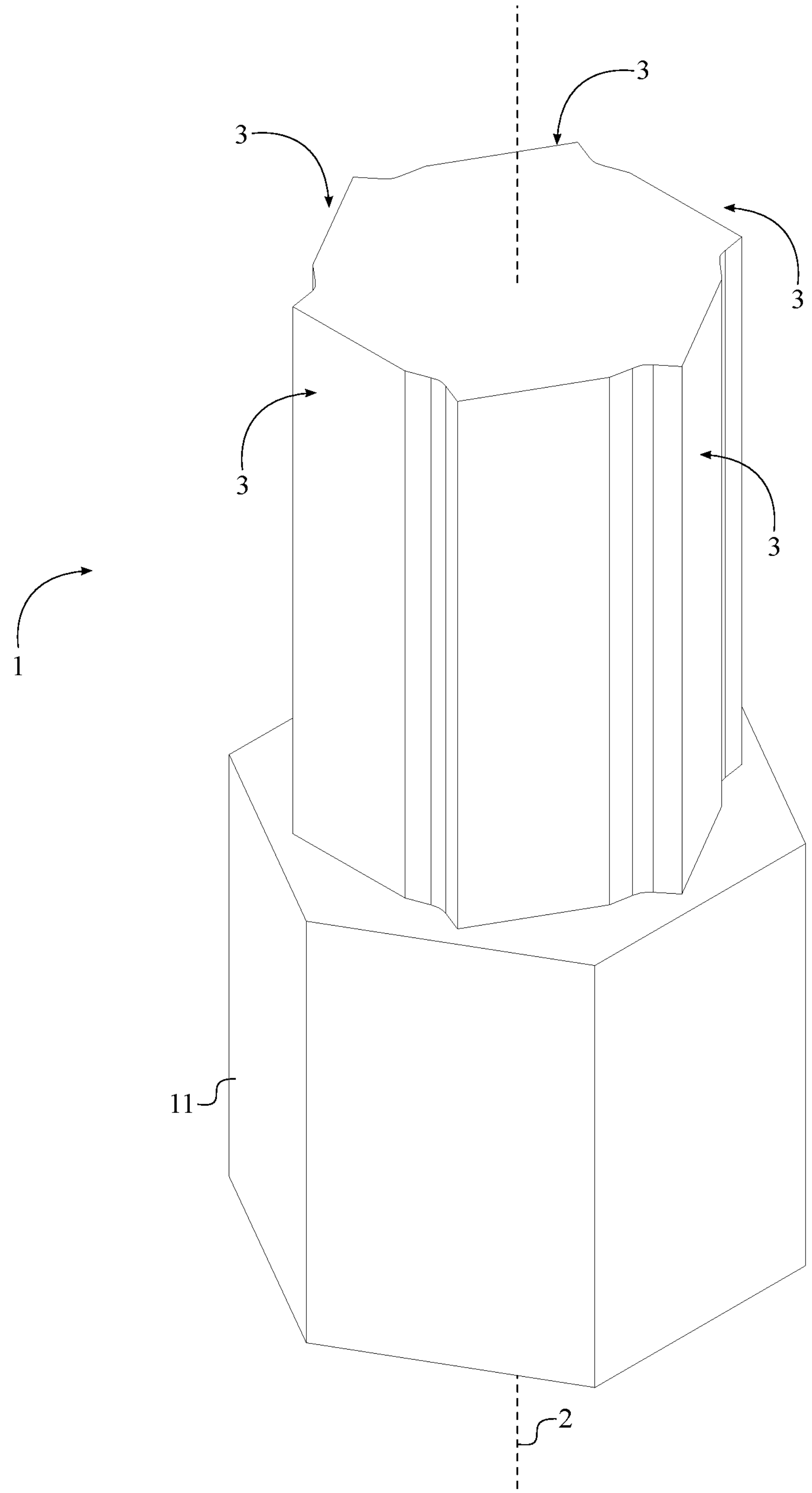
FIG. 5 is a perspective view of the second embodiment of the present invention.
Figure 6:
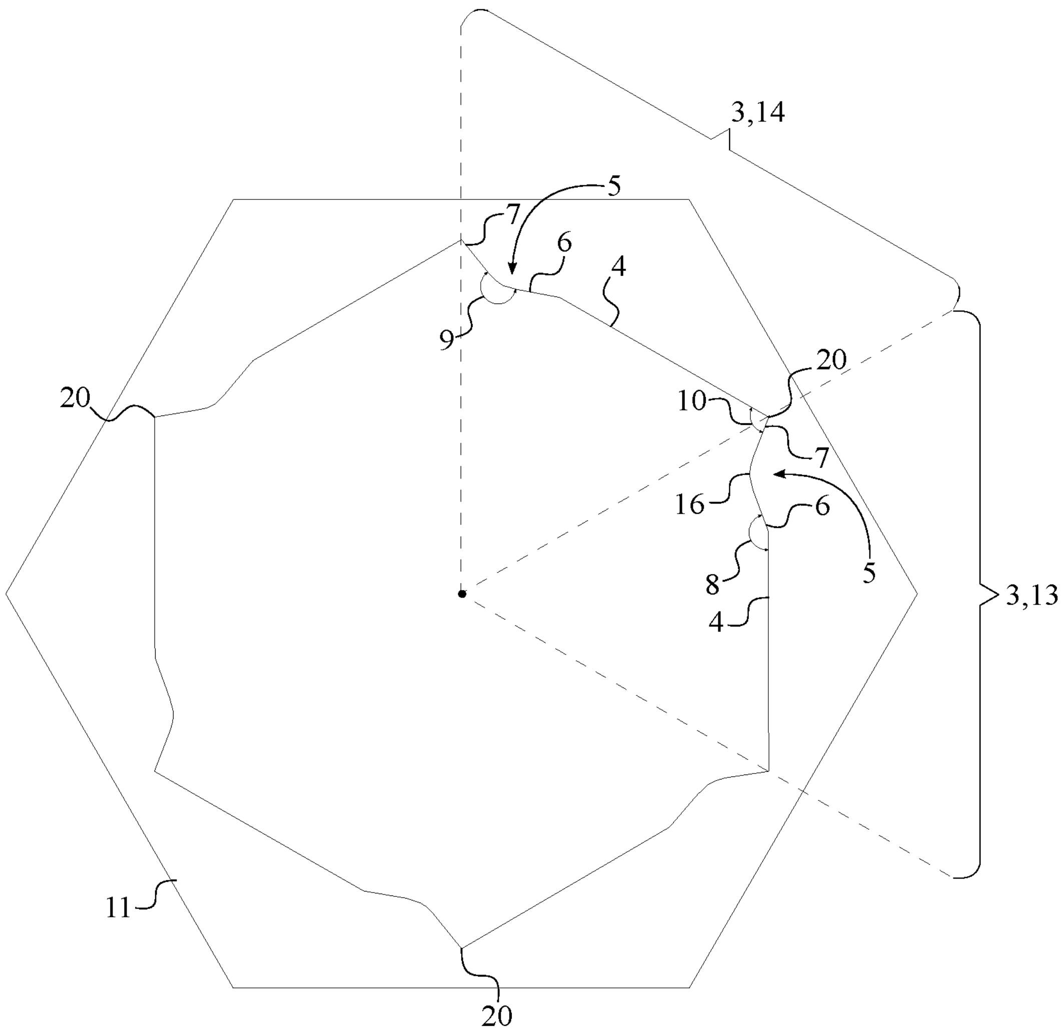
FIG. 6 is a top view of the second embodiment of the present invention, showing the configuration of the plurality of engagement features.
Figure 11:
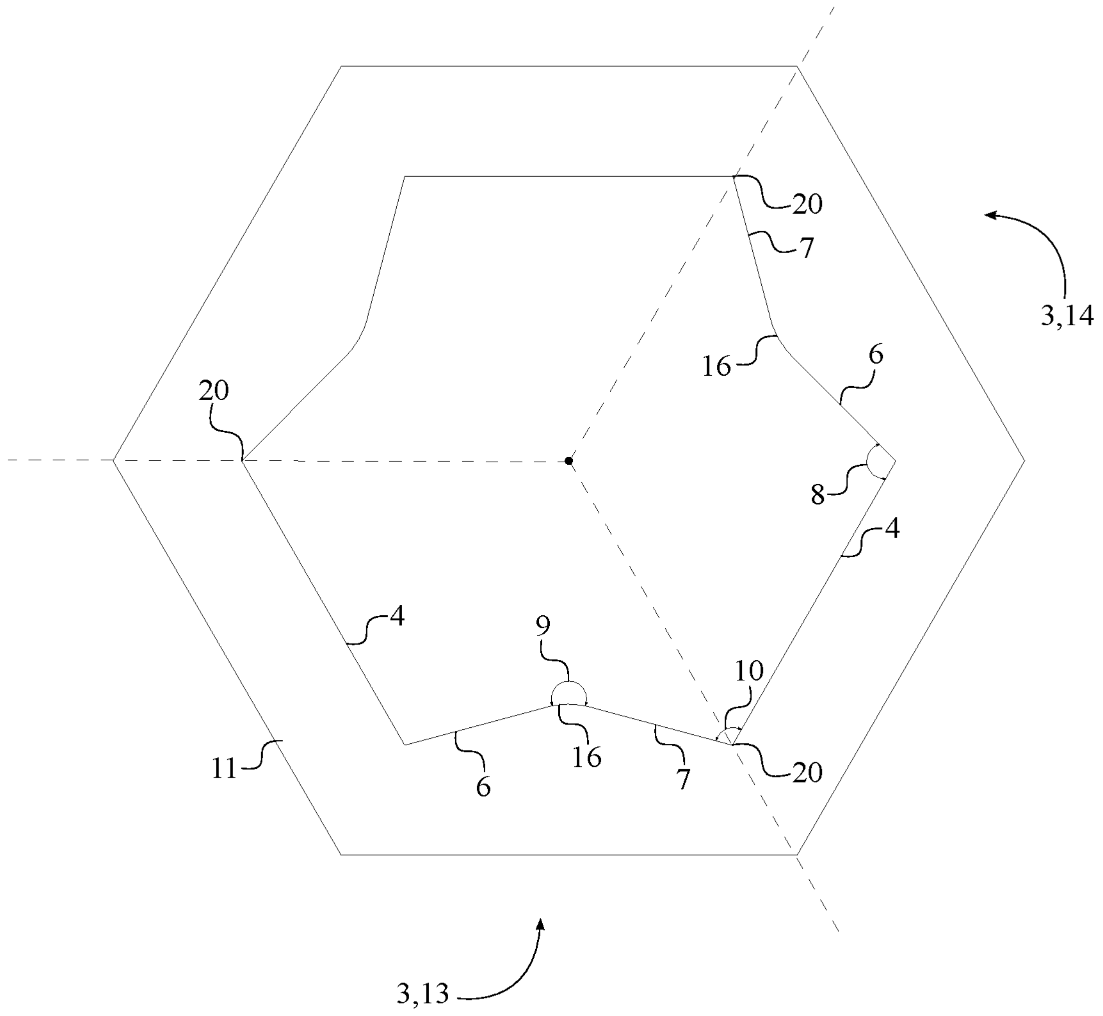
FIG. 11 is a top view for another configuration of the second embodiment of the present invention, showing the configuration of the plurality of engagement features.

In reference to a second embodiment of the present invention, the bracing portion 4 is adjacently connected to the first lateral section 6. The second lateral section 7 is positioned opposite of the bracing portion 4 about the first lateral section 6 and adjacently connected the first lateral section 6. More specifically, the second lateral section 7 of the arbitrary feature 13 and the bracing portion 4 of the adjacent feature 14 are adjacently positioned with each other about the third interior angle 10 thus delineating the radial profile of the second embodiment. Furthermore, the third interior angle 10 is an obtuse angle so that the gripping edge 20 can be oriented outward from the rotational axis 2. Preferably, the third interior angle 10 of the second embodiment is greater than 90 degrees and lesser than 120 degrees. Furthermore, the first lateral section 6 and the second lateral section 7 intersect tangent to a concave section 16, wherein a bottom edge of the cavity portion 5 is defined offset from the actual intersecting point of the first lateral section 6 and the second lateral section 7. The plurality of engagement features 3 of the second embodiment is equally spaced about the torque-tool body 1 to create an enclosed profile as seen in FIG. 5-6. The length of the bracing portion 4, the first lateral section 6, and the second lateral section 7 may change. In this embodiment, preferred length ratio between the bracing portion 4 and the cavity portion 5 is 2:1. Similarly, the first interior angle 8, the second interior angle 9, and the third interior angle 10 may vary to create a sharper gripping edge 20 of the second embodiment. For example, FIG. 6 illustrates six plurality of engagement features 3 while FIG. 11 illustrates three plurality of engagement features 3 as length of the first lateral section 6, length of the second lateral section 7, and the degrees of the first interior angle 8, the second interior angle 9, and the third interior angle 10 change from one embodiment to another.

Figure 7:
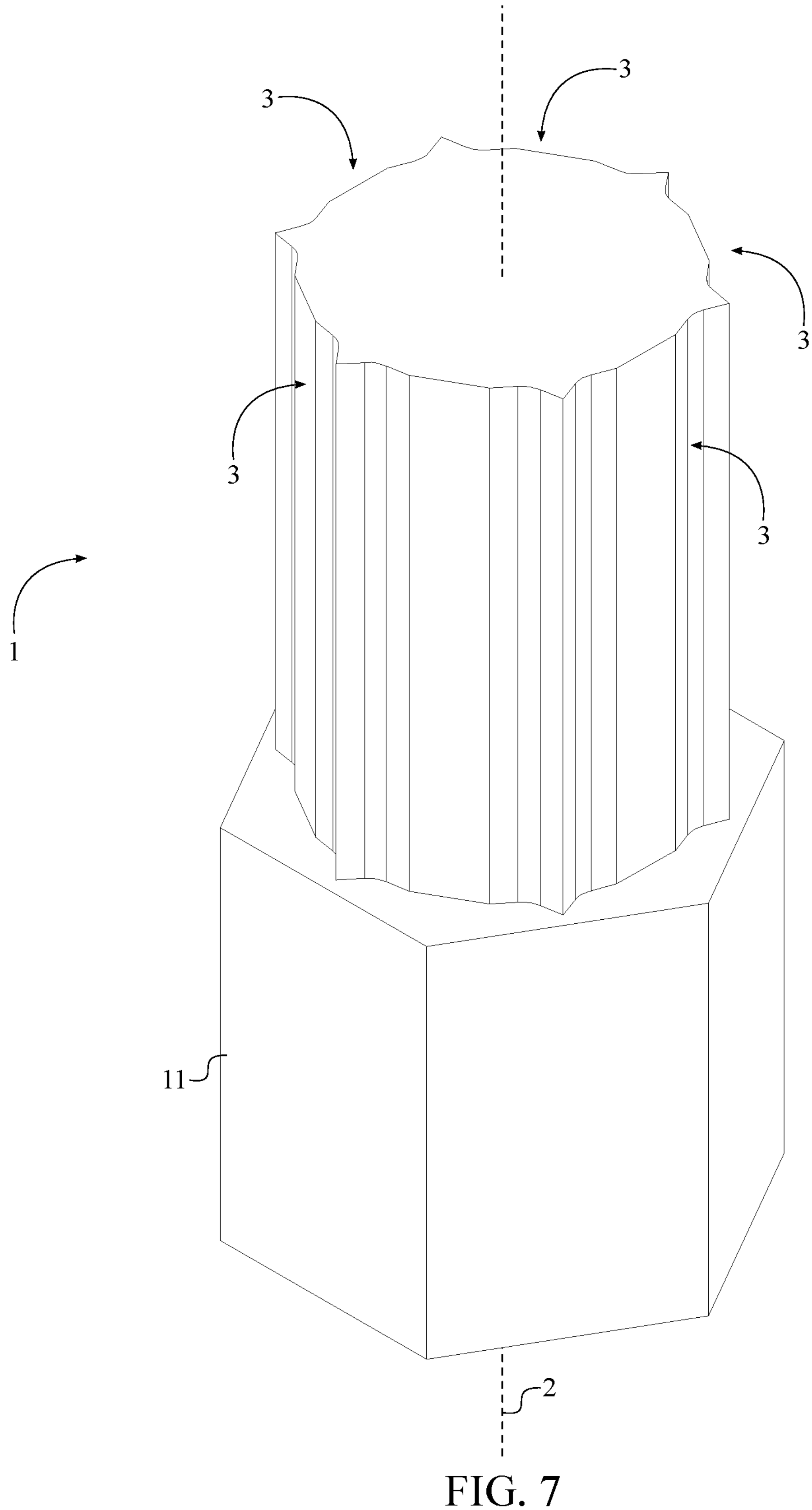
FIG. 7 is a perspective view of the third embodiment of the present invention.
Figure 8:
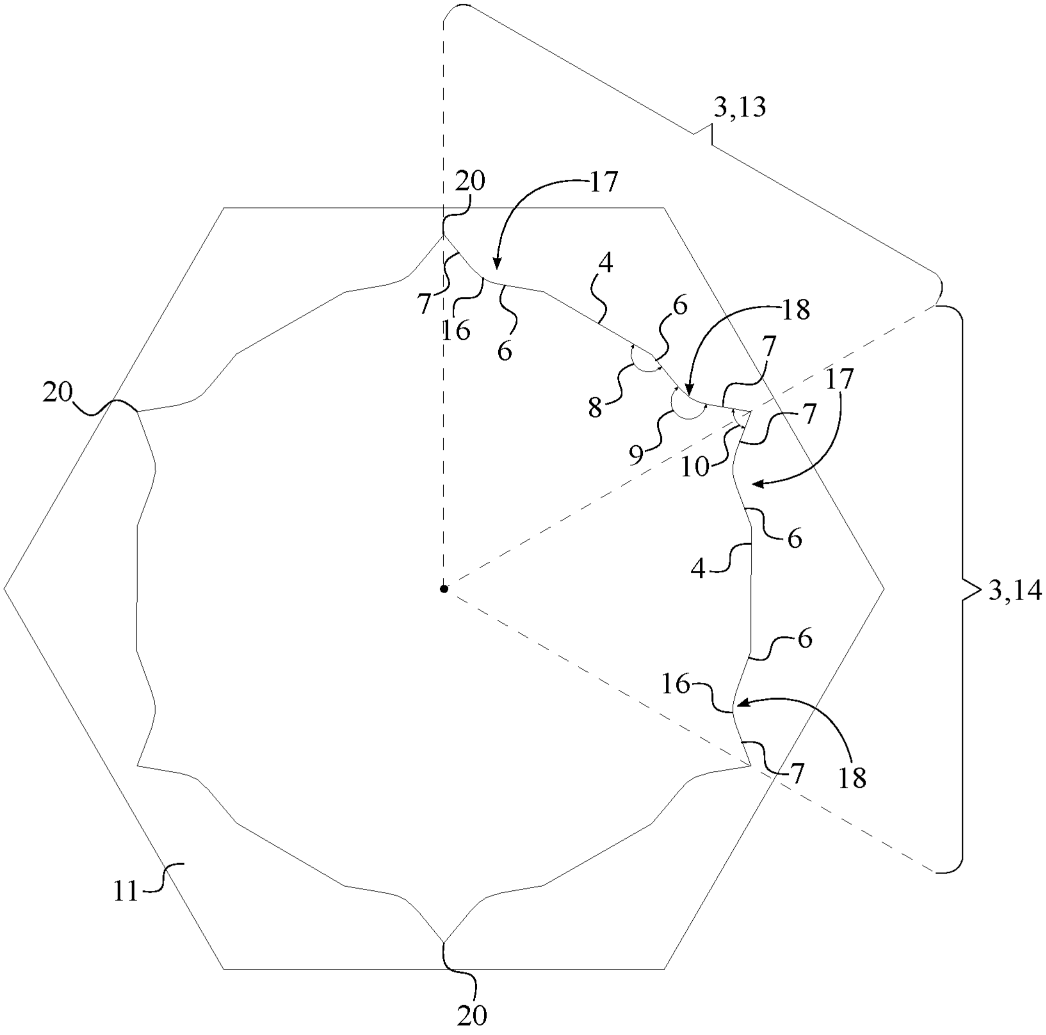
FIG. 8 is a top view of the third embodiment of the present invention, showing the configuration of the plurality of engagement features.

In reference to a third embodiment of the present invention, the at least one cavity portion 5 comprises a left cavity portion 17 and a right cavity portion 18 as shown in FIG. 7-8. More specifically, the bracing portion 4 is positioned in between the first lateral section 6 of the right cavity portion 18 and the first lateral section 6 of the left cavity portion 17. The bracing portion 4 is adjacently connected to the first lateral section 6 of the right cavity portion 18. The bracing portion 4 is adjacently connected to the first lateral section 6 of the left cavity portion 17. The second lateral section 7 of the right cavity portion 18 is adjacently connected to the first lateral section 6 of the right cavity portion 18, opposite of the bracing portion 4. The second lateral section 7 of the left cavity portion 17 is adjacently connected to the first lateral section 6 of the left cavity portion 17, opposite of the bracing portion 4. In reference to the plurality of engagement features 3, the second lateral section 7 for the right cavity portion 18 of the arbitrary feature 13 and the second lateral section 7 for the left cavity portion 17 of the adjacent feature 14 are adjacently positioned with each other about the third interior angle 10 thus delineating the radial profile of the third embodiment. Furthermore, the third interior angle 10 is an obtuse angle so that the gripping edge 20 can be oriented outward from the rotational axis 2. Preferably, the third interior angle 10 of the third embodiment is greater than 90 degrees and lesser than 120 degrees. Furthermore, the first lateral section 6 of the right cavity portion 18 and the second lateral section 7 of the right cavity portion 18 intersect tangent to the concave section 16, wherein a bottom edge of the right cavity portion 18 is defined offset from the actual intersecting point of the first lateral section 6 of the right cavity portion 18 and the second lateral section 7 of the right cavity portion 18. Furthermore, the first lateral section 6 of the left cavity portion 17 and the second lateral section 7 of the left cavity portion 17 intersect tangent to the concave section 16, wherein a bottom edge of the left cavity portion 17 is defined offset from the actual intersecting point of the first lateral section 6 of the left cavity portion 17 and the second lateral section 7 of the left cavity portion 17. The plurality of engagement features 3 of the third embodiment is equally spaced about the torque-tool body 1 to create an enclosed profile as seen in FIG. 8. The length of the bracing portion 4, the first lateral section 6, and the second lateral section 7 may change. The preferred length ratio between the bracing portion 4 and the left cavity portion 17 or the right cavity portion 18 is 3:1 or substantially equal. Similarly, the first interior angle 8, the second interior angle 9, and the third interior angle 10 may vary to create a sharper gripping edge 20 of the third embodiment.

Figure 9:
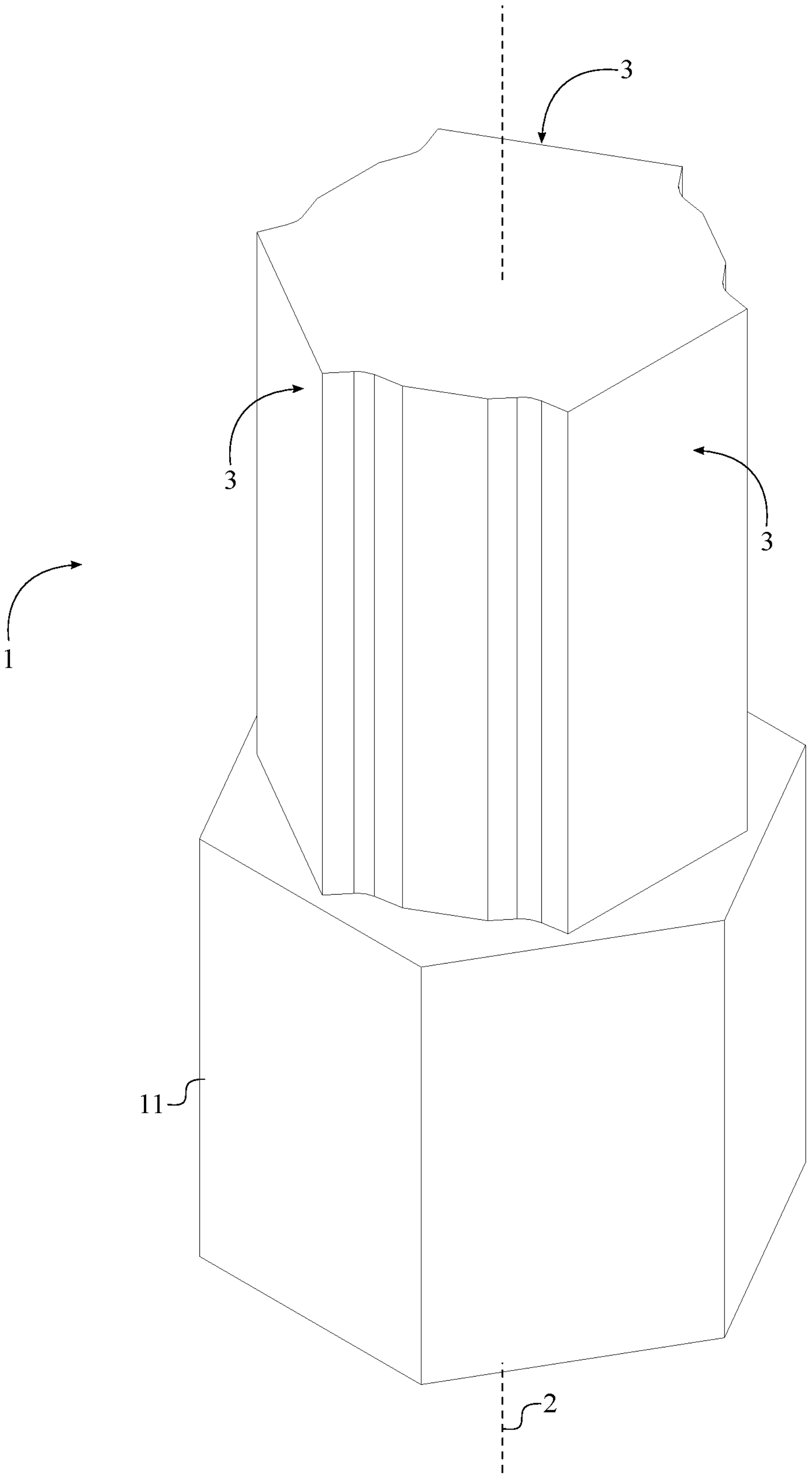
FIG. 9 is a perspective view of the fourth embodiment of the present invention.
Figure 10:
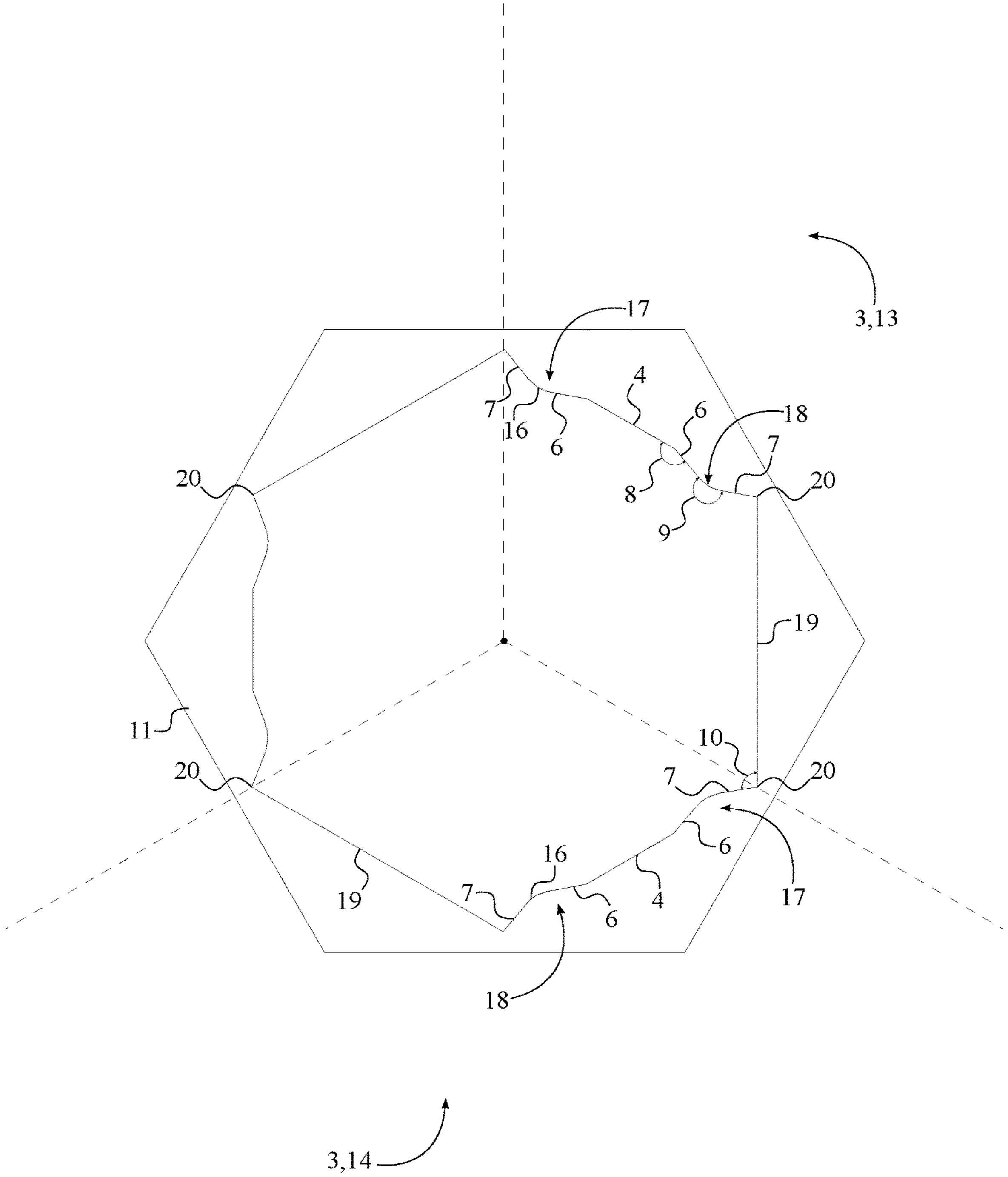
FIG. 10 is a top view of the fourth embodiment of the present invention, showing the configuration of the plurality of engagement features.

In reference to a fourth embodiment of the present invention, the fourth embodiment comprises a flat portion 19, and the at least one cavity portion 5 comprises the left cavity portion 17 and the right cavity portion 18 as shown in FIG. 9-10. More specifically, the bracing portion 4 is positioned in between the first lateral section 6 of the right cavity portion 18 and the first lateral section 6 of the left cavity portion 17. The bracing portion 4 is adjacently connected to the first lateral section 6 of the right cavity portion 18. The bracing portion 4 is adjacently connected to the first lateral section 6 of the left cavity portion 17. The second lateral section 7 of the right cavity portion 18 is adjacently connected to the first lateral section 6 of the right cavity portion 18, opposite of the bracing portion 4. The second lateral section 7 of the left cavity portion 17 is adjacently connected to the first lateral section 6 of the left cavity portion 17, opposite of the bracing portion 4. The flat portion 19 is adjacently connected to the second lateral section 7 of the right cavity portion 18. In reference to the plurality of engagement features 3, the second lateral section 7 for the right cavity portion 18 of the arbitrary feature 13 and the second lateral section 7 for the left cavity portion 17 of the adjacent feature 14 are adjacently positioned with each other about the third interior angle 10 thus delineating the radial profile of the fourth embodiment. Furthermore, the third interior angle 10 is an obtuse angle so that the gripping edge 20 can be oriented outward from the rotational axis 2. Preferably, the third interior angle 10 of the fourth embodiment is greater than 90 degrees and lesser than 120 degrees. Furthermore, the first lateral section 6 of the right cavity portion 18 and the second lateral section 7 of the right cavity portion 18 intersect tangent to the concave section 16, wherein a bottom edge of the right cavity portion 18 is defined offset from the actual intersecting point of the first lateral section 6 of the right cavity portion 18 and the second lateral section 7 of the right cavity portion 18. Furthermore, the first lateral section 6 of the left cavity portion 17 and the second lateral section 7 of the left cavity portion 17 intersect tangent to the concave section 16, wherein a bottom edge of the left cavity portion 17 is defined offset from the actual intersecting point of the first lateral section 6 of the left cavity portion 17 and the second lateral section 7 of the left cavity portion 17. The plurality of engagement features 3 of the fourth embodiment is equally spaced about the torque-tool body 1 to create an enclosed profile as seen in FIG. 10. The length of the bracing portion 4, the first lateral section 6, and the second lateral section 7 may change. Similarly, the first interior angle 8, the second interior angle 9, and the third interior angle 10 may vary to create a sharper gripping edge 20 of the fourth embodiment. When the torque-tool body 1 is initially inserted into the fastener socket head, contact between the plurality of engagement features 3 and socket fastener bracing surface is only made with the bracing surface 4, the flat surface 19, and the gripping edge 20, while the cavity portion 5 remains separated from the fastener bracing surface.

The present invention also incorporates an attachment feature which allows an external torque tool to attach to the torque-tool body 1 and increase the torque force applied to the damaged/stripped fastener. In reference to FIG. 2-3, the present invention further comprises an attachment body 11 and an engagement bore 12 that allow an external tool such as an open ended wrench, a box ended wrench, a combination wrench, an adjustable wrench, and a socket wrench or ratchet to be attached to the torque-tool body 1. The attachment body 11 is centrally positioned around and along the rotational axis 2 in order to align with the axis of rotation of the torque tool. In other words, the attachment body 11 is connected adjacent to the base of the torque-tool body 1 and positioned opposite of the plurality of engagement features 3. The attachment body 11 is preferably of a circular socket design but may be a hexagonal or square design with a diameter preferably and slightly larger than the diameter for the base of the torque-tool body 1. However, the attachment body 11 may incorporate a smaller diameter than the base depending on the base size and the preferred manufacturing method or design. The attachment body 11 is not limited any particular style or profile and may also incorporate a Hex key or any other attachment body as preferred by the end user. The engagement bore 12 traverses into the attachment body 11 along the rotational axis 2. The engagement bore 12 is shaped to receive a male attachment member of a socket wrench, wherein the preferred shape of the engagement bore 12 is a square as the majority of socket wrenches utilize a square male attachment member. In alternative embodiments, the shape and design of the engagement bore 12 and the attachment body 11 may vary to be adaptable to different torque tools and different attachment means including, but not limited to, square or cylindrical. In an alternative embodiment, an outer surface of the attachment body 11 may have surface griping treatment applied such as knurling or other alternative methods that would increase the friction between torque-tool body 1 and any driven embodiments.

Optionally, a bottom surface of the attachment body 11 is tapered away from the engagement bore 12 so that the plurality of engagement features 3 can be driven into the damaged/stripped fasteners by a hammer, without hitting or damaging the engagement bore 12. In other words, a height of the attachment body 11 about the engagement bore 12 is slightly larger than a height of the attachment body 11 about the external surface of the attachment body 11 so that the bottom surface can be tapered away from the engagement bore 12. As an alternative option, the attachment body 11 may not have an engagement bore 12 but rather a drive head designed for striking with a hammer or other force tools and concentrically attached to a rod or bar of any shape and attached to the torque-tool body 1 described within. This feature enables the torque-tool body 1 to be used as an extractor for severely damaged or rounded fasteners.

To remove the damaged/stripped fastener with the present invention, the torque-tool body 1 is positioned within the damaged/stripped fastener internal socket head so that a significant portion of the plurality of engagement features 3 is positioned within the fastener head. The user then simply applies a counter-clockwise torque force to the torque-tool body 1 in order to rotate and remove the damaged/stripped fastener. When a torque force is applied to the torque-tool body 1, the plurality of engagement features 3 bites into the internal lateral corners of the female opening of fastener head which in turn rotates the fastener. The present invention is designed to engage partially or fully stripped fastener heads. The present invention overcomes slippage of the fastener head through the use of the plurality of engagement features 3 since each of the plurality of engagement features 3 delineates the gripping edge 20. It is further understood that the present invention is in no way limited to this option but may be used to rotate both new or damaged fasteners in both clockwise and counterclockwise directions.

Figure 12:
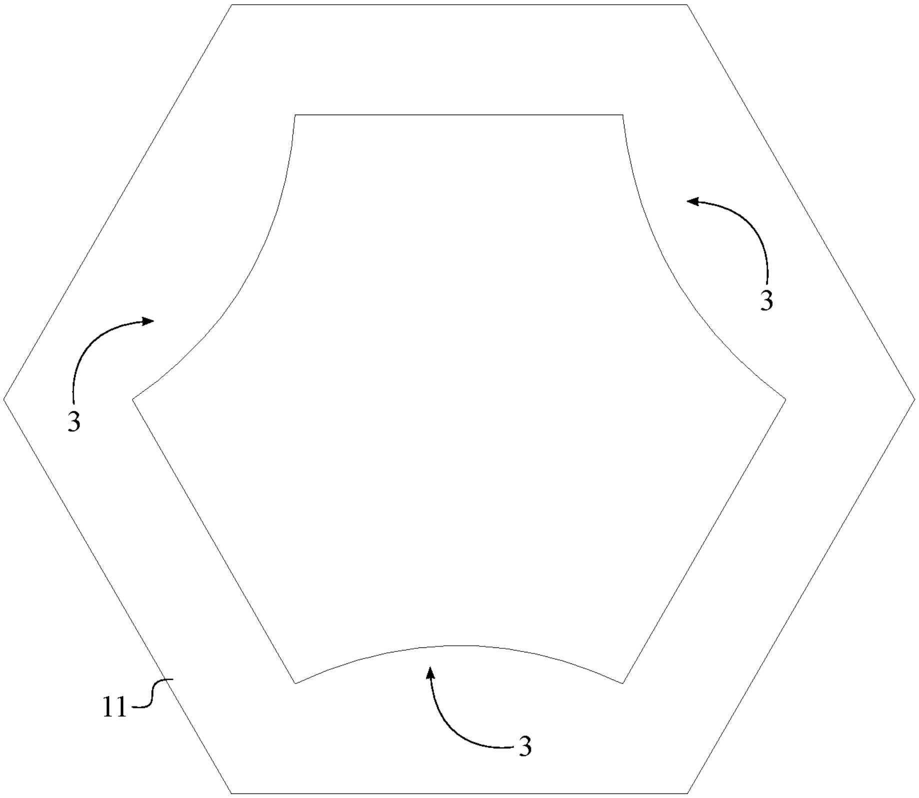
FIG. 12 is a top view of the first alternative embodiment of the present invention, showing the configuration of the plurality of engagement features.

In a first alternative embodiment of the present invention, the plurality of engagement features 3 comprises a curved portion and the flat portion 19 as shown in FIG. 12. More specifically, the curved portion is adjacently connected to the flat portion 19. In order to complete the enclosed profile of the first alternative embodiment, the flat portion 19 of the arbitrary feature 13 and the curved portion of the adjacent feature 14 are adjacently connected to each other. The length of the curved portion, the flat portion 19 and the corresponding angle between those portions may vary to create a sharper gripping edge 20 for the first alternative embodiment.

Figure 13:
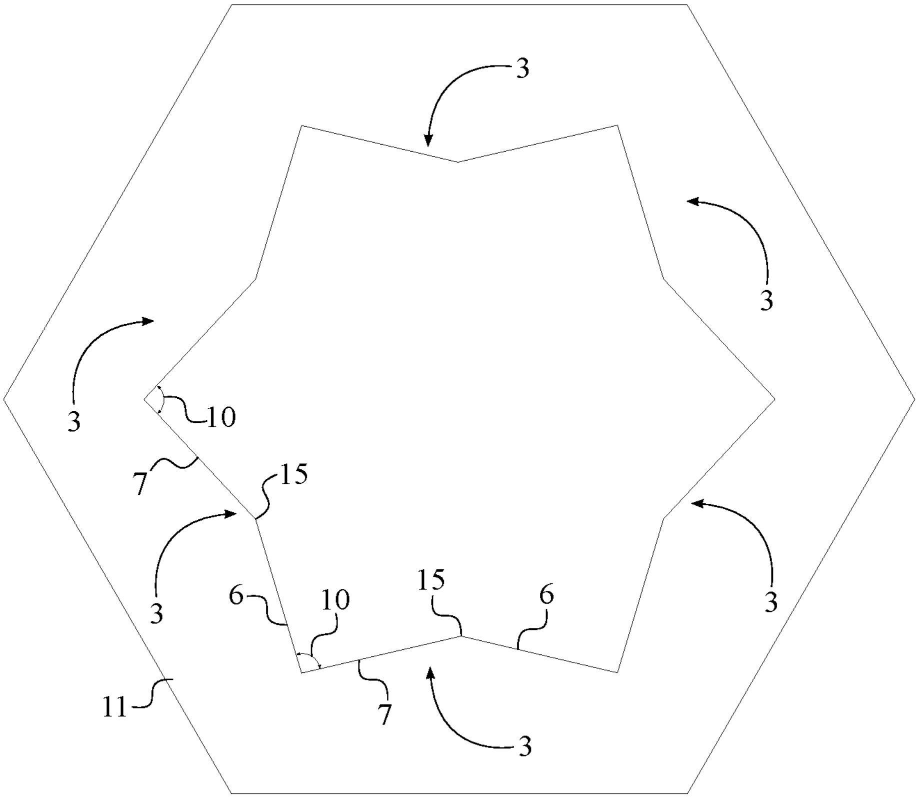
FIG. 13 is a top view of the second alternative embodiment of the present invention, showing the configuration of the plurality of engagement features.

In a second alternative embodiment of the present invention, the plurality of engagement features 3 comprises a curved portion as shown in FIG. 13. In order to complete the enclosed profile of the second alternative embodiment, the curved portion of the arbitrary feature 13 and the curved portion of the adjacent feature 14 are adjacently connected to each other. The length of the curved portion and the corresponding angle between two curved portions may vary to create a sharper gripping edge 20 for the second alternative embodiment.

Although the invention has been explained in relation to its preferred embodiment, it is to be understood that many other possible modifications and variations can be made without departing from the spirit and scope of the invention as hereinafter claimed.

What is claimed is:

1. An anti-slip multidirectional fastener remover tool comprises:

a torque-tool body;

a plurality of engagement features;

a cross section for each of the plurality of engagement features comprising a bracing portion, a plurality of cavity portions, a first interior angle, and a second interior angle;

the plurality of engagement features being radially distributed about a rotational axis of the torque-tool body;

the bracing portion and the cavity portions being adjacently connected to each other about the first interior angle;

the cavity portions being oriented towards the rotational axis;

the second interior angle being delineated between a first lateral section and a second lateral section of the cavity portions;

the plurality of cavity portions comprising a left cavity portion and a right cavity portion;

a flat portion;

the bracing portion being positioned in between the first lateral section of the right cavity portion and the first lateral section of the left cavity portion;

the bracing portion being adjacently connected to the first lateral section of the right cavity portion;

the bracing portion being adjacently connected to the first lateral section of the left cavity portion;

the second lateral section of the right cavity portion being adjacently connected to the first lateral section of the right cavity portion, opposite of the bracing portion;

the second lateral section of the left cavity portion being adjacently connected to the first lateral section of the left cavity portion, opposite of the bracing portion;

the flat portion being adjacently connected to the second lateral section of the right cavity portion; and the second interior angle being a reflex angle.

2. The anti-slip multidirectional fastener remover tool as claimed in claim 1 comprising:

the torque-tool body being outwardly extended from the rotational axis to the plurality of engagement features.

3. The anti-slip multidirectional fastener remover tool as claimed in claim 1 comprises:

an attachment body;

an engagement bore;

the attachment body being centrally positioned around and along the rotational axis;

the attachment body being adjacently connected to the torque-tool body; and the engagement bore traversing into the attachment body along the rotational axis, opposite of the torque-tool body.

4. The anti-slip multidirectional fastener remover tool as claimed in claim 1, wherein the first interior angle is an obtuse angle.

5. The anti-slip multidirectional fastener remover tool as claimed in claim 1 comprising:

a third interior angle;

the plurality of engagement features comprising an arbitrary feature and an adjacent feature; and the flat portion of the arbitrary feature and the second lateral section for the left cavity portion of the adjacent feature being adjacently positioned with each other about the third interior angle.

6. The anti-slip multidirectional fastener remover tool as claimed in claim 5, wherein the third interior angle is an obtuse angle.

7. The anti-slip multidirectional fastener remover tool as claimed in claim 1, wherein the first lateral section of the right cavity portion and the second lateral section of the right cavity portion intersect tangent a concave section.

8. The anti-slip multidirectional fastener remover tool as claimed in claim 1, wherein the first lateral section of the left cavity portion and the second lateral section of the left cavity portion intersect tangent a concave section.

* * * * *